United States Patent [19]

Fujioka et al.

[11] Patent Number: 4,908,704
[45] Date of Patent: Mar. 13, 1990

[54] METHOD AND APPARATUS FOR OBTAINING AN OBJECT IMAGE AND DISTANCE DATA OF A MOVING OBJECT

[75] Inventors: Arisa Fujioka, Kawaguchi; Sadakazu Watanabe, Kawasaki, both of Japan

[73] Assignee: Kabushiki Kaisha Toshiba, Kawasaki, Japan

[21] Appl. No.: 282,257

[22] Filed: Dec. 9, 1988

[30] Foreign Application Priority Data

Dec. 11, 1987 [JP] Japan ............... 62-312192

[51] Int. Cl.$^4$ ............................. H04N 7/18
[52] U.S. Cl. ................... 358/108; 358/105
[58] Field of Search ............... 358/105, 108, 125, 126, 358/109, 93, 107; 340/531, 539, 565, 990, 995, 937; 364/456, 458, 460; 382/23, 48; 342/64–66; 367/93, 94

[56] References Cited

U.S. PATENT DOCUMENTS 4,249,207 2/1981 Harman et al. ................. 358/108
4,709,264 11/1987 Tamura et al. ................ 358/105 X

FOREIGN PATENT DOCUMENTS 6265182 3/1987 Japan .
62154177 7/1987 Japan .
62203707 8/1987 Japan .

Primary Examiner—James J. Groody
Assistant Examiner—Victor R. Kostak
Attorney, Agent, or Firm—Oblon, Spivak, McClelland, Maier & Neustadt

[57] ABSTRACT

An apparatus for monitoring a moving object comprises an image memory for storing a reference monitor image of a designated monitor region, a distance map memory for storing a distance map, the monitor image of the designated monitor region and the distance map comprising a plurality of blocks having distance data from a predetermined reference point in the monitor region to points corresponding to the blocks, an object image detector for detecting an object image based on an input monitor image of the designated monitor region and the reference monitor image read out from the image memory, and a distance detector for detecting a distance from the reference point to the moving object in accordance with the detected object image and the distance map read out from the distance map memory.

17 Claims, 6 Drawing Sheets

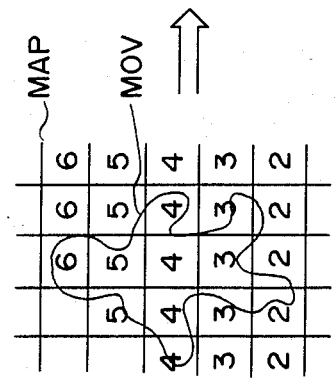
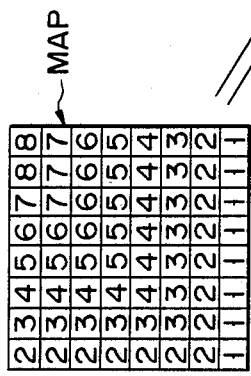
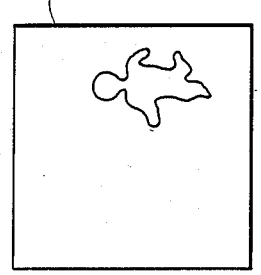
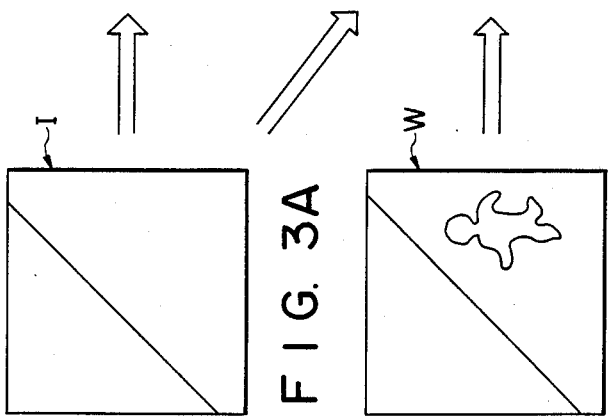
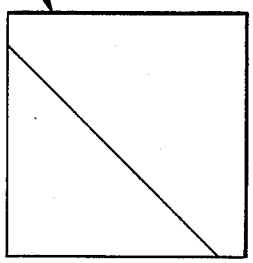
FIG. 3A  FIG. 3B  FIG. 3C  FIG. 3D  FIG. 3E  FIG. 3F

METHOD AND APPARATUS FOR OBTAINING AN OBJECT IMAGE AND DISTANCE DATA OF A MOVING OBJECT

BACKGROUND OF THE INVENTION

1. Field of the Invention

The present invention relates to a monitoring method and a monitor apparatus capable of readily obtaining data necessary for the generation of an alarm; for example, determining the distance to a moving object which has entered a monitor region, by means of an image processing technique.

2. Description of the Related Art

Conventional monitor apparatuses which use an image processing technique to detect the entry of a moving object into a specific indoor or outdoor monitor region are in widespread use. In a monitor apparatus of this type, in order to detect an object entering a monitor region, a difference between an initial image when no entering object is present and the monitoring image is obtained. In the monitor apparatus, an object entering its monitor region is detected, an alarm is preferably generated, and data associated with a distance to the object is preferably detected. In addition, the dimensions of the object are preferably detected.

However, in order to detect the distance to or the dimensions of an entering object, a plurality of image pickup devices must be used to stereoscopically monitor the object, and the data obtained must be subjected to three-dimensional image processing, which is a complicated operation. Satisfying this requirement results in a monitor apparatus which is undesirably complex and bulky, and, inevitably expensive. Japanese Unexamined Patent Disclosure No. 62-65182 proposes a technique in which sampling rates for remote and local points with respect to an object image obtained in a field of view of one image pickup device are varied, and the sampling rates for remote points are segmented more finely than local points, thereby performing object recognition with respect to distance. However, with this technique, the distance to the object of the dimensions of the object cannot be detected.

SUMMARY OF THE INVENTION

The present invention has been developed in consideration of the above situation, and has as its object to provide a practical monitoring method and a monitor apparatus capable of detecting a moving object entering a monitor region and obtaining data necessary for generation of an alarm, such as the distance to the moving object, thus effectively generating an alarm.

The monitor apparatus according to the present invention comprises: an image memory for storing a reference monitor image of a designated monitor region; a distance map memory for storing a distance map, the monitor image of the designated monitor region and the distance map comprising a plurality of blocks having distance data from a predetermined reference point to points in the monitor region corresponding to each of the blocks; an object image detector for detecting an object image of the moving object from an input monitor image of the designated monitor region and the reference monitor image stored in the image memory; and a distance detector for detecting the distance from the reference point to the moving object, from the detected object image and the distance map read out from the distance map memory.

The monitoring method of the present invention comprises: storing a reference monitor image of a designated monitor region in a reference image memory; generating a distance map of the designated monitor region, the monitor image of the designated monitor region and the distance map comprising a plurality of blocks having distance data from a predetermined reference point to points in the monitor region corresponding to each of the blocks; detecting an object image of the moving object from a monitor image of the designated monitor region and the reference monitor image; and detecting a distance from the reference point to the moving object from the location of the detected object image and the distance map.

According to the present invention, an entering object image detected upon comparison with an initial image need only be compared with a distance map, thus obtaining distance data of a moving object. More specifically, when an object enters a monitor region, a reference monitor image is partially shielded. The reference monitor image portion shielded by the entering object is present at a position distant at least from the entering object. Therefore, minimum distance data of distance data obtained from the distance map in pixels wherein the entering object image is detected can be obtained. Therefore, data necessary for monitoring can be effectively obtained without requiring complicated image processing. As a result, very effective alarm control can be performed.

BRIEF DESCRIPTION OF THE DRAWINGS

FIGS. 3A to 3F are views for explaining the operation of the first embodiment;

DETAILED DESCRIPTION OF THE PREFERRED EMBODIMENTS

A monitor apparatus according to the present invention will be described hereinafter, with reference to the accompanying drawings.

An arrangement of a first embodiment of a monitor apparatus according to the present invention will now be described below, with reference to FIG. 1.

Figure 1:
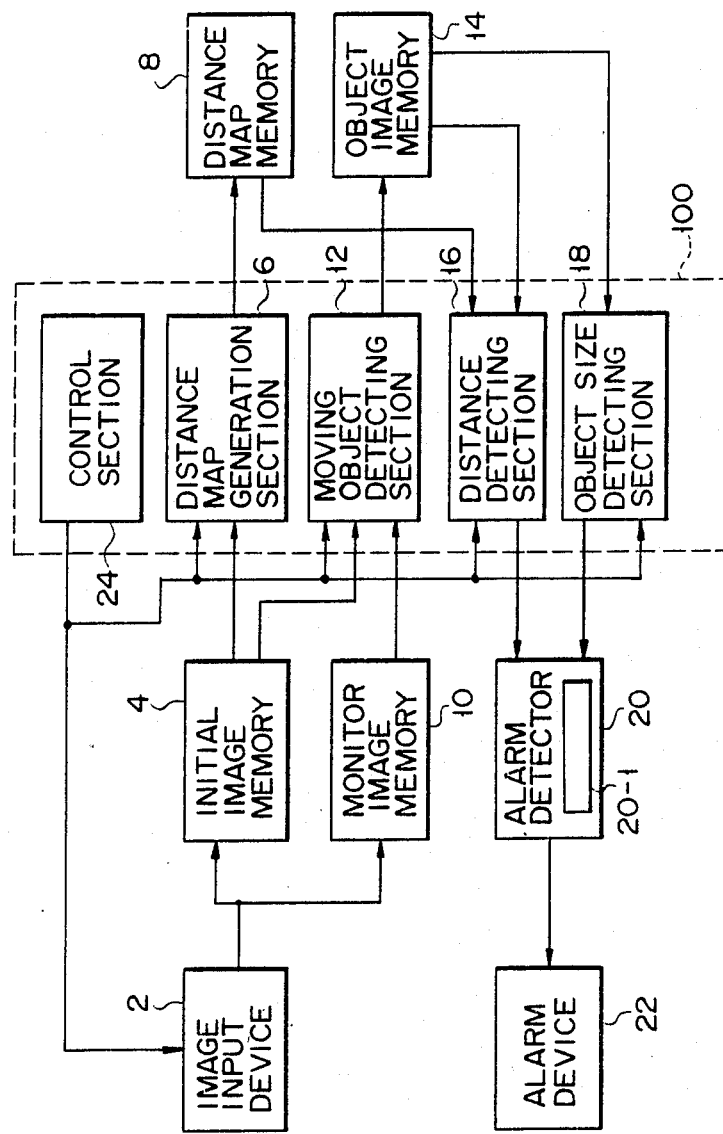
FIG. 1 is a block diagram showing an arrangement of a first embodiment of a monitor apparatus according to the present invention.

In FIG. 1, image input device 2 views a predetermined monitor region, and senses and takes in the monitor region as an image. Image input device 2 includes, e.g., a single TV camera. An initial image input through image input device 2, i.e., an image which is sensed and input while no entering object is present in the predetermined monitor region, is stored in initial image memory 4, in accordance with a first storage instruction from control section 24, and is then used for detection of a moving object, as will be described later. Monitor images sequentially input through image input device 2 are sequentially stored in monitor image memory 10 in accordance with a second storage instruction from control section 24, and are compared with the initial image for the purpose of detecting a moving object.

Image processor 100 is an arithmetic processing apparatus such as a microprocessor, and comprises distance map generation section 6, moving object detecting section 12, distance detecting section 16, object size detecting section 18, and control section 24. Control section 24 generates various control instructions for controlling the operations of the overall apparatus. Distance map generation section 6 generates a distance map on the basis of the initial monitor image stored in memory 4, in accordance with a generation instruction from control section 24, and the distance map generated is stored in distance map memory 8. Moving object detecting section 12 detects an object image from the initial image stored in memory 4 and the monitor image stored in memory 10 in accordance with an object detection instruction from control section 24, and stores the object image detected in object image memory 14. Distance detecting section 16 detects the distance from a predetermined reference point to the moving object, on the basis of the object image stored in memory 14 and the distance map stored in memory 8, in accordance with a distance detection instruction from control section 24. Object size detecting section 18 detects the number of blocks of the object image in accordance with a size detection instruction from control section 24. Alarm detector 20 has reference table 20-1, and generates an alarm control instruction in accordance with the detected number of blocks. Alarm device 22 generates an alarm in accordance with the alarm control instruction.

The operation of the first embodiment will now be described below, with reference to FIG. 2.

In step 202, an initial image of the monitor region sensed by image input device 2 is input and stored in initial image memory 4 in accordance with a first storage instruction from control section 24. In step 204, distance map generation section 6 divides the initial image stored in memory 4 into blocks in accordance with the generation instruction from control section 24, and calculates distance data from a predetermined reference point to points represented by the blocks. A distance map is generated based on the distance data obtained for all the blocks, and is stored in distance map memory 8. Note that each block can be defined for one pixel or can be defined in units of a plurality of pixels. The predetermined reference position is determined as, e.g., a position where image input device 2 is installed. The distance data may be ones actually measured using a distance measurement device, or, the distance data can be obtained by coordinate transformation between a given plane in a three-dimensional space of the monitor region and a plane as the monitor image of the monitor region.

More specifically, when coordinates on the initial image plane are given by u and v, transformed coordinates on an arbitrary plane in the three-dimensional space are given by x and y, and transformation parameters are K1, K2, ..., K8, if the transformation formulas below are solved for x and y, a distance from the coordinate value of the reference position to each pixel can be calculated.

$$u = \frac{K1 + K2x + K3y}{1 + K4x + K5y}$$

-continued $$v = \frac{K6 + K7x + K8y}{1 + K4x + K5y}$$

Note that transformation parameters K1, K2, ..., K8 can be specified by giving x- and y-coordinates of arbitrary four points, and corresponding u- and v-coordinates. Distance calculation is made for typical points without calculating distances to all the points, and distances for points among the typical points can be calculated by interpolation.

In this manner, distance map MAP for initial image I shown in FIG. 3A is generated, as shown in FIG. 3B upon processing of distance map generation section 6, and is stored in memory 8.

If, in step 206, sensed monitor image W shown in FIG. 3C is stored in monitor image memory 10 in accordance with the second storage instruction from control section 24, moving object detecting section 7 executes differential processing between the monitor image W and initial image I stored in initial image memory 4 in accordance with the object detection instruction from control section 24, and detects an image which is not present in the initial image, as moving object image MOV, as shown in FIG. 3D, in step 208. More specifically, blocks causing a change in image with respect to initial image I are extracted, and a group of blocks are detected as an image of the moving object entering the predetermined monitor region. Moving object image MOV detected in this manner is stored in moving object image memory 14.

In step 210, distance detecting section 16 refers to distance map memory 6 for the object image shown in FIG. 3D and stored in memory 14 in accordance with the distance detection instruction from control section 24, and obtains the distance data of the blocks corresponding to the moving object. For example, when object image MOV is obtained as shown in FIG. 3D with respect to a plurality of blocks obtained by segmenting the initial image, distance data for blocks which the moving object shields are fetched from distance map memory 6 as shown in FIG. 3E. In this case, the distance data are obtained like (6,5,5, ... 4,4, ... 3,3, ... 2,2).

Since the distance data obtained for the blocks from which the moving object is detected are those of the initial image shielded by the moving object, that is, since the distance data are data of the initial image portion shielded by the moving object and distant at least from the present position of the moving object, distance detecting section 16 obtains the minimum distance data thereamong as the present position, e.g., the distance data of the moving object. More specifically, if the moving object always contacts a ground surface (road surface), distance data obtained for a block where the lowermost portion of object image MOV is present can be regarded as a position where the moving object is present. As described above, in this apparatus, the distance to the moving object entering the predetermined monitor region is detected. Object size detecting section 18 detects a block area of object image MOV, i.e., the number of blocks. The detected distance and number of blocks are output to alarm detector 20.

The size of object image MOV differs depending on the distance to the moving object, as a matter of course. In other words, an object at a remote point appears to be small and one at a local point appears to be large.

Therefore, the size of the moving object cannot be determined based on only the size of object image MOV detected by object size detecting section 18. Thus, based on the detected distance data and the number of blocks, alarm detector 20 determines in step 212 whether or not an alarm is to be generated, as follows. FIG. 3F illustrates reference table 20-1 showing an alarm determination reference. A reference for generating an alarm is determined in accordance with the distance data and the number of blocks. The determination reference indicates a relationship between the distance to an image of a certain moving object and its size so as to generate an alarm, and is determined by examining the relationship in advance. In FIG. 3F, the determination reference is set such that when the size of the image of an object detected at a position of distance (4) is obtained, i.e., the number of blocks exceeds 66, an alarm is generated.

If it is determined in step 214 that the distance data and the number of blocks detected for the moving object do not meet the alarm determination reference, the object is determined as an entering object other than an object to be monitored, and the flow returns to step 206. Thus, the subsequent processing continues.

However, if it is determined in step 214 that the distance data and the number of blocks meet the alarm determination reference, the alarm control instruction is generated from alarm detector 20 to alarm device 22, and a necessary action, e.g., generation of an alarm sound, turning on of an alarm lamp, or alarming to a monitor center, or the like, is taken.

As described above, according to the apparatus of this embodiment, the distance map is generated based on the initial image. When an entering object is determined upon comparison between the initial image and the monitor image, the distance data for the entering object is very easily and efficiently obtained by referring to the distance map. Therefore, since not only entrance of an object into the monitor region but also the distance (position) to the entering object can be obtained, an appropriate alarm can be generated under a very effective monitor condition. In particular, according to the apparatus of this embodiment, since the size of the entering object can be detected, an alarm can be easily and effectively generated. Since distance data for the entering object can be obtained without requiring complicated and large-scale processing unlike in the conventional apparatus, the arrangement of the apparatus can be greatly simplified and enjoy a large reduction in cost.

Note that the present invention is not limited to the above embodiment. For example, the size and number of blocks for generating the distance memory map can be determined in accordance with the specifications of an apparatus. A calculation technique of distance data of each block in the distance map is not particularly limited. The object size detecting section described above may be omitted when a monitor system is realized. Furthermore, when it is confirmed based on the distance data to the moving object calculated in accordance with the sequentially detected monitor images that the entering object gradually goes away, alarm cancel control can be performed.

A second embodiment of a monitor aparatus according to the present invention will be described below.

Figure 4:
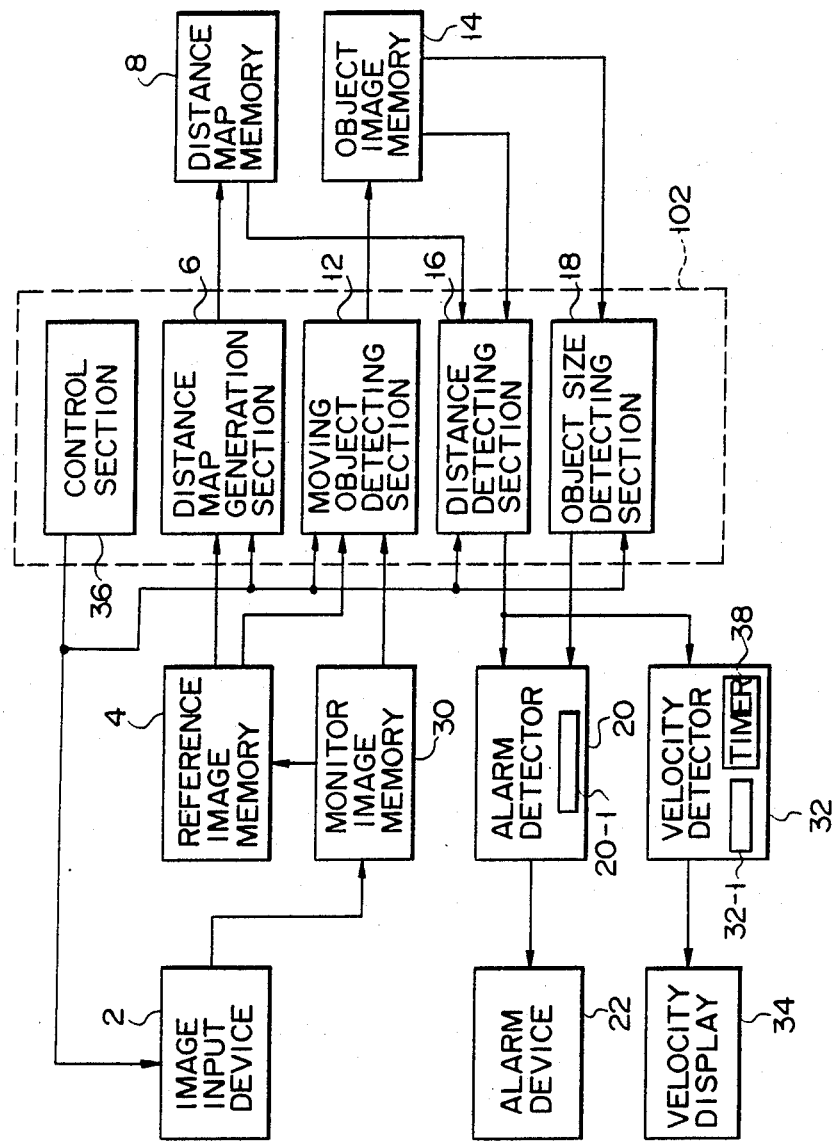
FIG. 4 is a block diagram showing an arrangement of a second embodiment of a monitor apparatus according to the present invention.

FIG. 4 shows the arrangement of the second embodiment. The arrangement of the second embodiment is similar to that of the first embodiment, as can be seen from FIG. 4. Therefore, the same reference numerals in the second embodiment denote the same parts as in the first embodiment, and a detailed description thereof will be omitted. Only a difference will be explained below.

A monitor image from image input device 2 is stored in monitor image memory 30 in accordance with a first storage instruction from control section 36. The monitor image is stored in reference image memory 4 in accordance with a second storage instruction from control section 36. Velocity detector 32 has timer 38, and measures a time from when previous distance data is input until current distance data is input. Detector 32 detects a velocity in accordance with the distance data from distance detecting section 16 and the time data from timer 38, and outputs the detected velocity data to velocity display 34.

Figure 5:
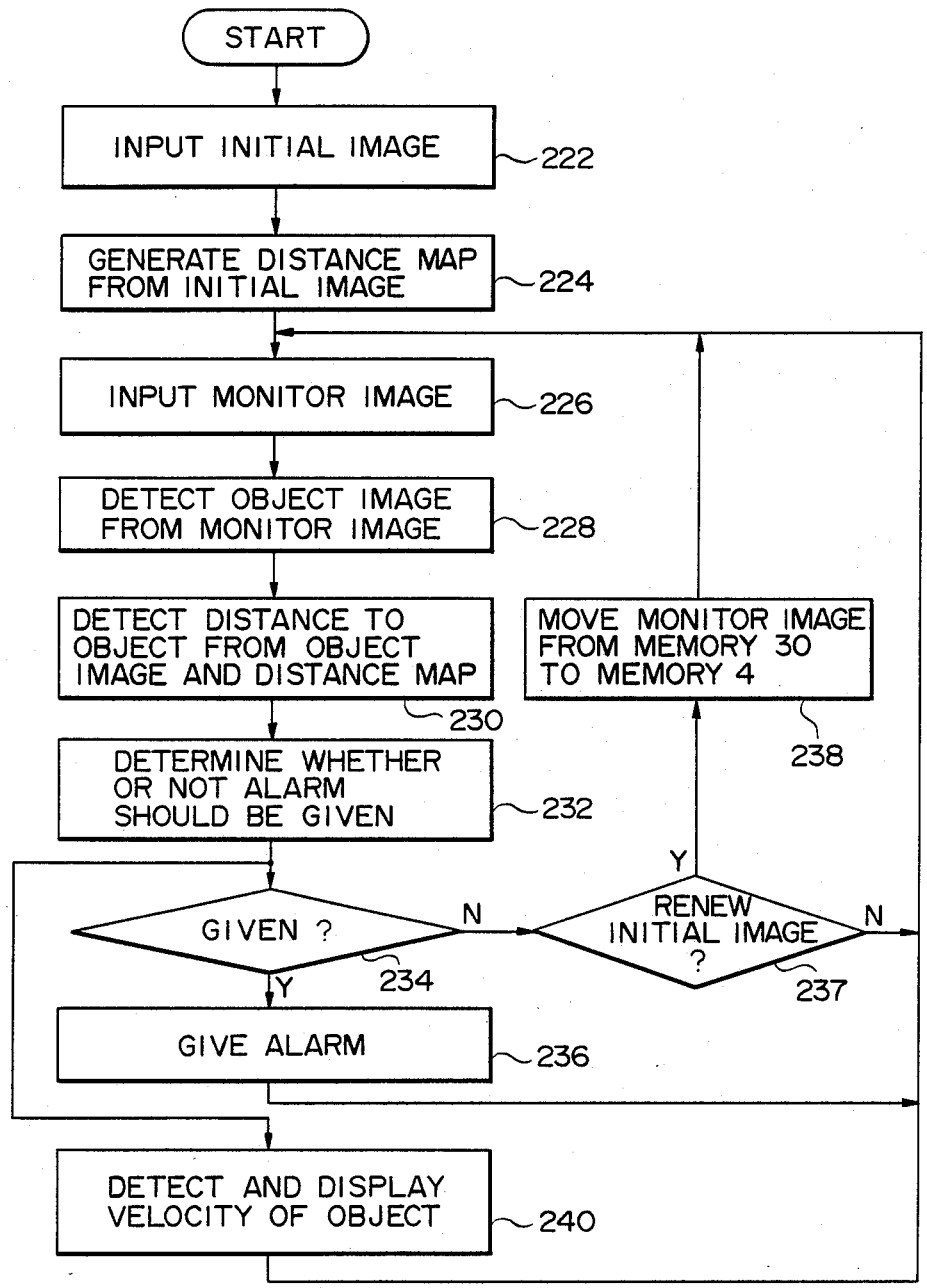
FIG. 5 is a flow chart for explaining the operation of the second embodiment.

The operation of the second embodiment will be described below with reference to FIG. 5.

Figure 2:
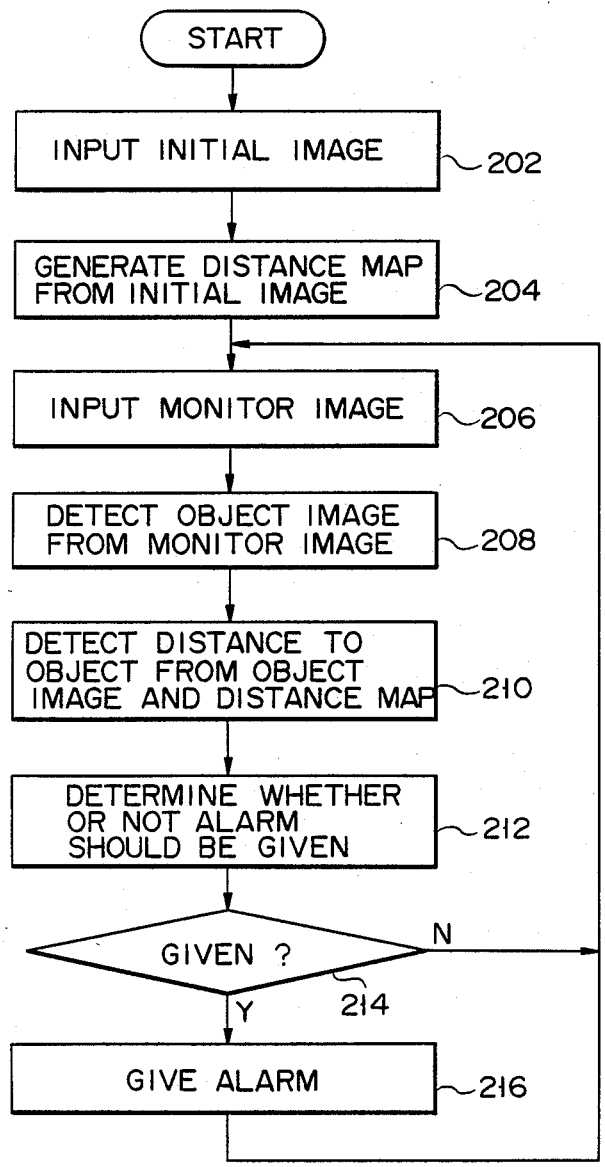
FIG. 2 is a flow chart for explaining the operation of the first embodiment.

The operation in steps 222 to 236 is the same as that in steps 202 to 216 shown in FIG. 2. If N in step 234, that is, if it is determined that an alarm need not be generated, it is determined whether or not the reference image is to be updated. If Y in step 237, the monitor image stored in memory 30 is transferred to memory 4 in step 238. If N in step 237, the flow returns to step 226. In step 240, velocity detector 32 measures a time between inputting of previous distance data stored in register 32-1 and inputting of current distance data using timer 38 to detect the velocity of the moving object, and causes velocity display 34 to display the detected velocity. Thereafter, timer 38 is reset, and the current distance data is stored in register 32-1 as the previous distance data.

According to the second embodiment, the velocity of the moving object can be detected as well as the distance to the moving object, thus allowing a more effective monitor operation.

A third embodiment of a monitor apparatus according to the present invention will be described below. The third embodiment is a monitor apparatus suitable for monitoring a plurality of management regions.

Figure 6:
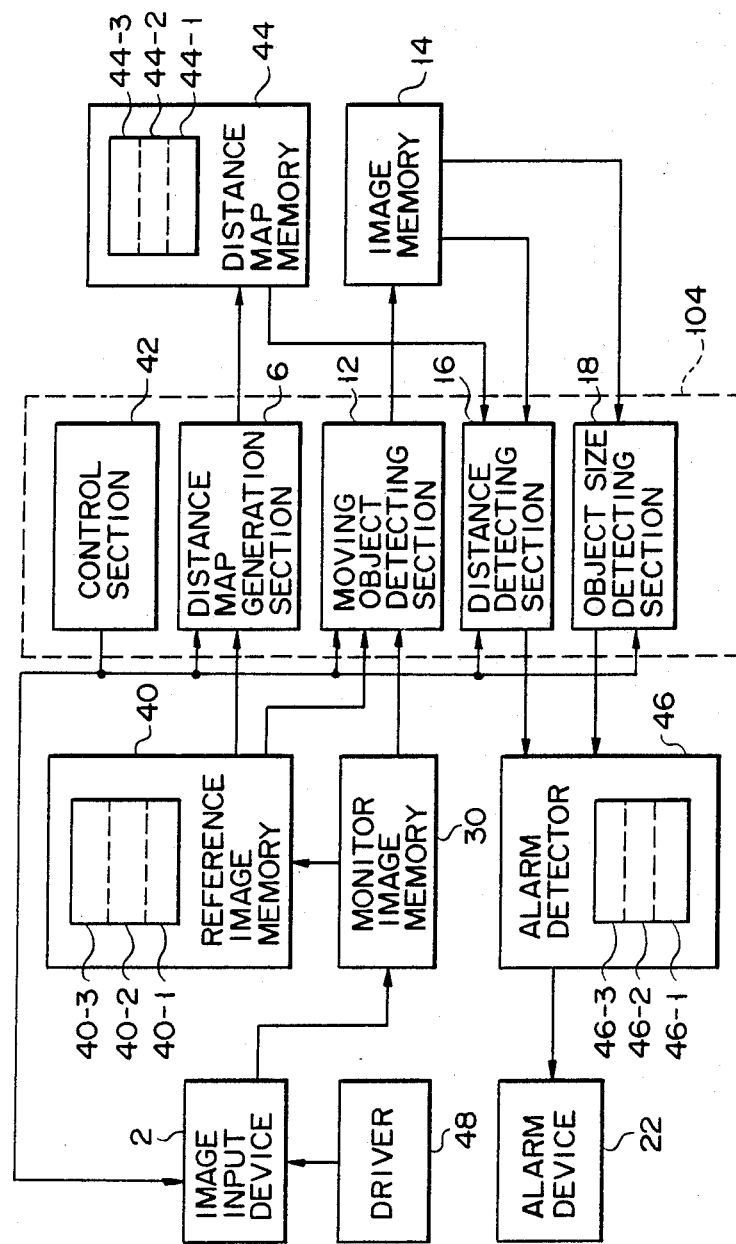
FIG. 6 is a block diagram showing an arrangement of a third embodiment of a monitor apparatus according to the present invention.

The arrangement of the third embodiment shown in FIG. 6 is similar to those of the first and second embodiments. Therefore, the same reference numerals in the third embodiment denote the same parts as in the first and second embodiments, and a detailed description thereof will be omitted. Only a difference will be explained below.

In the third embodiment, the number of monitor regions is assumed to be three. Image memory 40 has three reference monitor image storage areas 40-$i$ ($i$=1 to 3). Distance map memory 44 has three distance maps 44-$i$ corresponding to the three monitor regions. These distance maps are generated based on the monitor images stored in image storage areas 40-$i$. Furthermore, alarm detector 46 has three reference tables 46-$i$ corresponding to the three monitor regions. A monitor region being monitored by image input device 2 is selected in accordance with a drive control instruction from control section 42, and is driven by driver 48.

The operation of the third embodiment will be described below. Image input device 2 is driven by driver 48 in accordance with the drive instruction from control section 42, and monitors and senses the designated monitor region ($i$=1 to 3). The sensed monitor image is stored in memory 30. Thereafter, the same processing as in the first and second embodiments is executed for designated monitor region $i$.

What is claimed is:

1. An apparatus for monitoring a moving object, comprising:

image memory means for storing reference monitor images of a designated monitor region;

distance map generation means for performing predetermined transformation processing of the reference monitor image to generate a distance map from the reference monitor image, the distance map comprising a plurality of blocks, each block including at least one pixel, and the distance map having distance data from a predetermined reference point to points in the designated monitor region corresponding to each of the blocks;

distance map memory means for storing the distance map;

object image detecting means for detecting an object image of the moving object from an input monitor image of the designated monitor region and the reference monitor image stored in said image memory means; and distance detecting means for detecting a distance from the reference point to the moving object from the detected object image and the distance map stored in said distance map memory means.

2. An apparatus according to claim 1, further comprising:

size detecting means for comparing the distance map in said distance map memory means with the detected object image by said object image detecting means to count the number of blocks corresponding to the detected object image and detecting an object size form the counted value; and alarm means for generating an alarm in accordance with the distance detected by said distance detecting means and the detected object size.

3. An apparatus for monitoring a moving object, comprising:

image memory means for storing a reference monitor image of a designated monitor region;

distance map memory means for storing a distance map, the distance map comprising a plurality of blocks, and the distance map having distance data from a predetermined reference point to points in the designated monitor region corresponding to each of the blocks;

object image detecting means for detecting an object image of the moving object from an input monitor image of the designated monitor region and the reference monitor image stored in said image memory means;

distance detecting means for detecting a distance from the reference point to the moving object from the detected object image and the distance map stored in said distance map memory means; and alarm means for selectively generating an alarm in accordance with the distance detected by said distance detecting means.

4. An apparatus according to claim 3, further comprising:

velocity detecting means for detecting a velocity of the object in accordance with a distance previously detected by said distance detecting means, a distance currently detected thereby, and a time from the previous detection to the current detection.

5. An apparatus according to claim 3, further comprising:

means for, when the object image is not detected from the monitor image by said object image detecting means, storing the monitor image in said image memory means as the reference monitor image.

6. An apparatus for monitoring a moving object, comprising:

image memory means for storing reference monitor images corresponding to a plurality of monitor regions;

distance map memory means for storing a plurality of distance maps corresponding to the plurality of monitor regions, each of the monitor images corresponding to each monitor region and each of the distance maps comprising a plurality of blocks and having distance data from a predetermined reference point to points in one monitor region corresponding to each of the blocks;

designation means for designating one of the plurality of monitor regions, one of the plurality of reference monitor images, and one of the plurality of distance maps;

object image detecting means for detecting an object image of the object from an input monitor image of the designated monitor region and the designated reference monitor image; and distance detecting means for detecting a distance from the reference point to the moving object from the detected object image and the designated distance map.

7. An apparatus according to claim 6, further comprising:

distance map generating means for generating the plurality of distance maps from the plurality of reference monitor images, respectively.

8. An apparatus according to claim 7, wherein said distance map generating means includes means for performing predetermined transformation processing of the plurality of reference monitor images to generate the plurality of distance maps.

9. An apparatus according to claim 6, further comprising:

alarm means for selectively generating an alarm in accordance with the distance detected by said distance detecting means.

10. An apparatus according to claim 6, further comprising:

size detecting means for comparing the distance map corresponding to the detected object image with the detected object image by said object image detecting means to count the number of blocks corresponding to the detected object image and detecting an object size from the counted value; and alarm means for generating an alarm in accordance with the distance detected by said distance detecting means and the detected object size.

11. An apparatus according to claim 6, further comprising:

velocity detecting means for detecting a velocity of the object from a distance previously detected by said distance detecting means, a distance currently detected thereby, and a time from the previous detection to the current detection.

12. An apparatus according to claim 6, further comprising:

means for, when the object image is not detected by said object image detecting means, storing the monitor image in said image memory means as the designated reference monitor image.

13. A method of monitoring a moving state of an object in accordance with a distance map, comprising the steps of:
   storing a reference monitor image of a designated monitor region in an image memory;
   detecting an object image of the moving object from a monitor image of the designated monitor region and the stored reference monitor image; and
   detecting a distance from a predetermined reference point to the moving object from the detected object image and the distance map, the distance map comprising a plurality of blocks and having distance data from the predetermined reference point to points in the monitor region corresponding to each of the blocks.

14. A method according to claim 13, further comprising:
   generating the distance map from the reference monitor image.

15. A method according to claim 14, wherein said distance map generating step includes:
   generating the distance map by performing predetermined transformation processing of the reference monitor image.

16. A method according to claim 13, further comprising:
   selectively generating an alarm in accordance with the detected distance.

17. A method according to claim 13, further comprising:
   detecting the number of blocks constituting the detected object image; and
   generating an alarm in accordance with the detected distance and the detected number of blocks.

* * * * *

BEST AVAILABLE COPY